United States Patent
Onoe (10) Patent No.: US 12,489,274 B2
(45) Date of Patent: Dec. 2, 2025

(54) SEMICONDUCTOR DEVICE AND METHOD FOR MANUFACTURING SEMICONDUCTOR DEVICE

(71) Applicant: Mitsubishi Electric Corporation, Tokyo (JP)

(72) Inventor: Kazuyuki Onoe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 892 days.

(21) Appl. No.: 17/634,946

(22) PCT Filed: Jan. 22, 2020

(86) PCT No.: PCT/JP2020/002125
§ 371 (c)(1),
(2) Date: Feb. 11, 2022

(87) PCT Pub. No.: WO2021/149190
PCT Pub. Date: Jul. 29, 2021

(65) Prior Publication Data
US 2022/0294187 A1  Sep. 15, 2022

(51) Int. Cl.
*H01S 5/227* (2006.01)
*H01S 5/22* (2006.01)

(52) U.S. Cl.
CPC ............ *H01S 5/2272* (2013.01); *H01S 5/222* (2013.01); *H01S 5/2275* (2013.01)

(58) Field of Classification Search
CPC ..................................................... H01S 5/227
See application file for complete search history.

(56) References Cited

U.S. PATENT DOCUMENTS

2008/0290358 A1* 11/2008 Hiratsuka ............... H01S 5/227
  438/31
2011/0261848 A1* 10/2011 Takeuchi ............... B82Y 20/00
  438/39

FOREIGN PATENT DOCUMENTS

JP    2007035924 A  *  2/2007
JP    2010-206082 A     9/2010
JP    2011-249767 A    12/2011

OTHER PUBLICATIONS

English Translation of Sugo (Year: 2007).*
International Search Report issued in PCT/JP2020/002125; mailed Mar. 24, 2020.
Office Action issued in TW 109137607; issued by the Taiwan Intellectual Property Office on Jul. 15, 2021.

* cited by examiner

Primary Examiner — Minsun O Harvey
Assistant Examiner — Stephen Sutton Kotter
(74) Attorney, Agent, or Firm — Studebaker Brackett PLLC (57) ABSTRACT

A semiconductor device according to the present disclosure includes a main part that includes a semiconductor substrate, a first cladding layer provided on the semiconductor substrate, an active layer provided on the first cladding layer, and a second cladding layer provided on the active layer, and in which a flat part and a mesa part are formed, the mesa part including the active layer and a first embedded layer covering a top surface of the flat part and a side surface of the mesa part, wherein the first embedded layer has a projecting part on a top surface of a portion provided in a region within a height of the mesa part from a boundary between the mesa part and the flat part in the top surface of the flat part.

11 Claims, 9 Drawing Sheets

SEMICONDUCTOR DEVICE AND METHOD FOR MANUFACTURING SEMICONDUCTOR DEVICE

FIELD

The present disclosure relates to a semiconductor device and a method for manufacturing the semiconductor device.

BACKGROUND

PTL 1 discloses a method for manufacturing an optical semiconductor device. In this manufacturing method, an n type cladding layer, an active layer and a p type cladding layer formed in this order on a substrate are selectively subjected to an etching process to form a mesa structure. Next, a p type semiconductor layer is formed from a side surface of the mesa structure to a plane part other than the mesa structure on the substrate, the p type semiconductor layer having a thickness of 5 nm to 45 nm on the plane part. Next, a high resistivity semiconductor layer is formed on the p type semiconductor layer so as to embed the mesa structure. In the plane part, a product of the thickness of the p type semiconductor layer and a concentration of a p type dopant is $2.5 \times 10^{19}$ nm/cm$^3$ or less. Providing such a p type semiconductor layer makes it possible to suppress the leak current. In addition, the element capacitance generated inevitably when the p type semiconductor layer is formed can be reduced by sufficiently reducing the thickness of the p type semiconductor layer.

CITATION LIST

Patent Literature

[PTL 1] JP 2011-249767 A

SUMMARY

Technical Problem

A portion thinner than any other portion may arise in a first embedded layer due to an influence of a transition surface generated in an epitaxial growth process, the first embedded layer being the p type semiconductor layer configured to cover the mesa part and the flat part which are disclosed in PTL 1. This may cause interruption of the first embedded layer.

The present disclosure has an object to provide a semiconductor device capable of suppressing interruption of a first embedded layer and a method for manufacturing the semiconductor device.

Solution to Problem

A semiconductor device according to the present disclosure includes a main part that includes a semiconductor substrate, a first cladding layer of a first type which is one of an n type and a p type, the first cladding layer being provided on the semiconductor substrate, an active layer provided on the first cladding layer, and a second cladding layer of a second type which is the other of the n type and the p type, the second cladding layer being provided on the active layer, and in which a flat part and a mesa part are formed, the mesa part being provided adjacent to the flat part, projecting upward with respect to the flat part and including the active layer, a first embedded layer that is of the second type, and has a first portion configured to cover a top surface of the flat part and a second portion configured to cover a side surface of the mesa part, a second embedded layer that is provided on the first embedded layer and is of the first type, a first electrode provided above the mesa part and a second electrode provided below the mesa part wherein the first embedded layer has a projecting part on a top surface of a portion provided in a region within a height of the mesa part from a boundary between the mesa part and the flat part in the top surface of the flat part.

A method for manufacturing a semiconductor device according to the present disclosure includes a step of forming, on a semiconductor substrate, a first cladding layer of a first type which is one of an n type and a p type, forming an active layer on the first cladding layer, forming, on the active layer, a second cladding layer of a second type which is the other of the n type and the p type to form a main part having the semiconductor substrate, the first cladding layer, the active layer, and the second cladding layer, a step of forming, in the main part, a flat part and a mesa part that is provided to be adjacent to the flat part, projects upward with respect to the flat part, and includes the active layer, a first step of forming a first semiconductor layer being of the second type and formed into a lump shape in a region within a height of the mesa part from a boundary between the mesa part and the flat part in a top surface of the flat part, a second step of covering a side surface of the mesa part, the top surface of the flat part, and the first semiconductor layer with a second semiconductor layer of the second type to form a first embedded layer having the first semiconductor layer and the second semiconductor layer, a step of forming a second embedded layer of the first type on the first embedded layer, a step of forming a first electrode above the mesa part and a step of forming a second electrode below the mesa part.

Advantageous Effects of Invention

In the semiconductor device according to the present disclosure, the interruption of the first embedded layer can be suppressed by the projecting part.

In the method for manufacturing a semiconductor device according to the present disclosure, the interruption of the first embedded layer can be suppressed by the first semiconductor layer.

DESCRIPTION OF EMBODIMENTS

A semiconductor device and a method for manufacturing the semiconductor device according to each embodiment is described with reference to drawings. Identical or corresponding constitutional elements are given the same reference numerals, and the repeated description of such constitutional elements may be omitted.

First Embodiment

Figure 1:
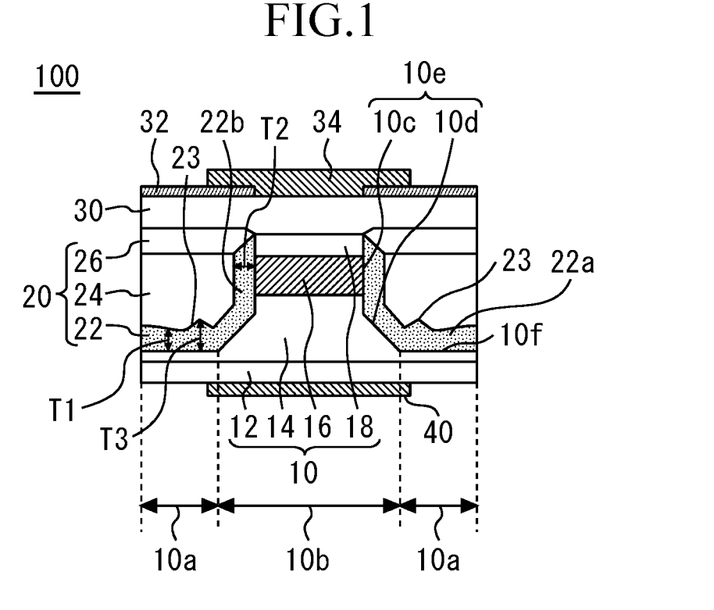
FIG. 1 is a cross-sectional view of a semiconductor device according to the first embodiment.

FIG. 1 is a cross-sectional view of a semiconductor device 100 according to the first embodiment. Note that a part of the semiconductor device 100 is not illustrated in FIG. 1. Hereinafter, n type and p type may be referred to as n- and p-, respectively. Each of a semiconductor operation surface and a surface of a substrate may be referred to as "on a substrate." The connection between the structures having an electrical function includes electrical or mechanical connection.

The semiconductor device 100 is, for example, an optical semiconductor device such as a semiconductor laser. The semiconductor device 100 is, for example, a semiconductor laser having an embedded structure. The semiconductor device 100 may have an embedded heterostructure.

The semiconductor device 100 includes a main part 10. The main part 10 includes a semiconductor substrate 12, a first type first cladding layer 14 provided on the semiconductor substrate 12, an active layer 16 provided on the first cladding layer 14, and a second type second cladding layer 18 provided on the active layer 16. The first cladding layer 14 and the second cladding layer 18 are also referred to as a separate confinement heterostructure (SCH) layer. In the present embodiment, the first type refers to an n type, and the second type refers to a p type. However, without limited thereto, the first type may refer to one of the n type and the p type, and the second type may refer to the other of the n type and the p type.

In the main part 10, a flat part 10a and a mesa part 10b are formed, the mesa part 10b being provided adjacent to the flat part 10a and projecting upward with respect to the flat part 10a. The mesa part 10b is formed in the shape of stripes. The flat part 10a is formed on both sides of the mesa part 10b. The mesa part 10b includes a part of the first cladding layer 14, the active layer 16, and the second cladding layer 18.

The semiconductor device 100 according to the present embodiment is of a p-InP/n-InP embedded type, for example. The semiconductor substrate 12 is formed of n-InP, for example. The first cladding layer 14 is formed of n-InP, for example. The second cladding layer 18 is formed of p-InP, for example.

Both sides of the mesa part 10b are embedded by an embedded layer 20. The embedded layer 20 includes a first embedded layer 22, a second embedded layer 24, and a third embedded layer 26. The first embedded layer 22 is of a p type. The first embedded layer 22 has a first portion 22a configured to cover a top surface 10f of the flat part 10a and a second portion 22b configured to cover a side surface 10e of the mesa part 10b. The first embedded layer 22 is provided along the side surface 10e of the mesa part 10b and the top surface 10f of the flat part 10a.

The side surface 10e of the mesa part 10b has a perpendicular surface 10c perpendicular to the top surface 10f of the flat part 10a, and an inclined surface 10d connected to the top surface 10f of the flat part 10a. The second portion 22b covers the perpendicular surface 10c and the inclined surface 10d. The second portion 22b is provided up to the same height as the top surface of the second cladding layer 18. The upper end portion of the second portion 22b is tapered.

The second embedded layer 24 is provided on the first embedded layer 22. The second embedded layer 24 is of an n type. The second embedded layer 24 is provided up to a height equal to or higher than the top surface of the active layer 16 and equal to or lower than the top surface of the second cladding layer 18, for example. The second embedded layer 24 is provided not to contact the mesa part 10b. The third embedded layer 26 is provided on the second embedded layer 24. The third embedded layer 26 is of a p type. The third embedded layer 26 is provided up to a position higher than the top surface of the second cladding layer 18.

The first embedded layer 22 is formed of p-InP, for example. The first embedded layer 22 contains Zn as a dopant, for example. The second embedded layer 24 is formed of n-InP, for example. The third embedded layer 26 is formed of p-InP, for example.

A contact layer 30 is provided on the mesa part 10b and the embedded layer 20. The contact layer 30 is formed of p-InP, for example. An insulating film 32 is provided on the contact layer 30. Above the mesa part 10b, a first electrode 34 is provided on the insulating film 32. The first electrode 34 is a p type electrode. Above the mesa part 10b, an opening is formed in the insulating film 32. The first electrode 34 is connected to the contact layer 30 in the opening. Below the mesa part 10b, a second electrode 40 is provided on the rear surface of the semiconductor substrate 12. The second electrode 40 is an n type electrode.

A projecting part 23 is provided on the top surface of the first embedded layer 22. The projecting part 23 is provided to be adjacent to a boundary between the mesa part 10b and the flat part 10a. A portion in which the projecting part 23 is provided on the first embedded layer 22 has a thickness thicker than that of a portion other than the projecting part 23 in the first portion 22a. The portion in which the projecting part 23 is provided on the first embedded layer 22 has a thickness thicker than that of the second portion 22b. That is, T3>T1 and T3>T2 are established. The portion in which the projecting part 23 is provided on the first embedded layer 22 may have a thickness thicker than that of a portion covering the inclined surface 10d in the first embedded layer 22.

The projecting part 23 is formed in a lump shape. In FIG. 1, the tip of the projecting part 23 is formed into a pointed shape. However, without limited thereto, the tip of the projecting part 23 may be formed into a round shape. A cross-sectional shape of the projecting part 23 may be formed into a quadrilateral shape or a polygonal shape.

Next, a method for manufacturing the semiconductor device 100 according to the present embodiment will be described. First, the first cladding layer 14 is formed on the semiconductor substrate 12. The semiconductor substrate 12 is formed into a flat plate shape, for example. The first cladding layer 14 is epitaxially grown by a metal organic chemical vapor deposition (MOCVD) method, for example.

Next, the active layer 16 is formed on the first cladding layer 14. The active layer 16 is epitaxially grown by the MOCVD method. The active layer 16 has a strained multi-quantum well (MQW) structure. This enables the semiconductor device 100 to achieve high output and low distortion, thereby accomplishing high performance. Next, the second cladding layer 18 is formed on the active layer 16. As described above, the main part 10 is formed.

Figure 2:
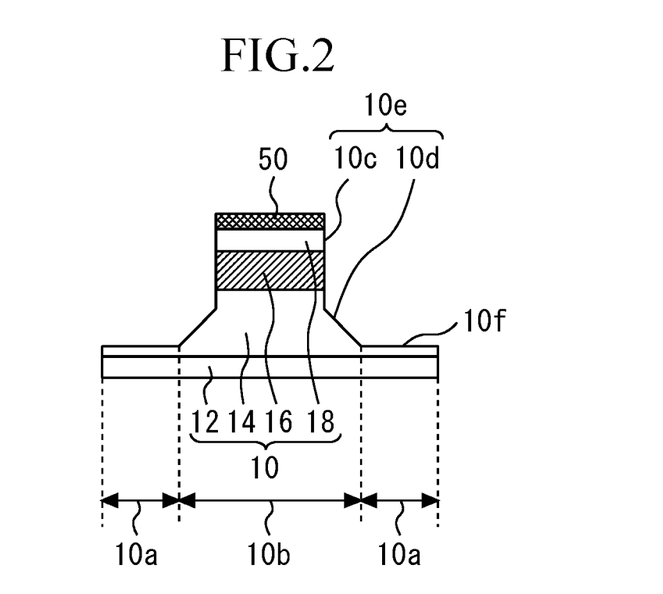
FIG. 2 is a diagram illustrating a state in which the flat part and the mesa part are formed.

Next, the flat part 10a and the mesa part 10b are formed in the main part 10. FIG. 2 is a diagram illustrating a state in which the flat part 10a and the mesa part 10b are formed. In this step, first, an insulating film 50 is formed on the top surface of the second cladding layer 18. The insulating film 50 is an SiO2 film, for example. The insulating film 50 is formed by a plasma chemical vapor deposition (CVD) method, for example. The insulating film 50 is used as a protective mask at the time of the embedding growth in a later step.

Next, in the insulating film 50, a portion other than a portion in which the mesa part 10b is formed is removed in a photolithography process. Next, the first cladding layer 14, the active layer 16, and the second cladding layer 18 are etched using the insulating film 50. In this way, the flat part 10a and the mesa part 10b are formed. The etching is plasma dry etching, for example.

The base portion of the mesa part 10b is removed by the plasma dry etching. In this way, the inclined surface 10d to be formed in the mesa part 10b. The base portion of the mesa part 10b is removed also by migration under the elevated temperature in the initial stage in a step of epitaxially growing the first embedded layer 22. Also in this step, the inclined surface 10d is formed.

Figure 3:
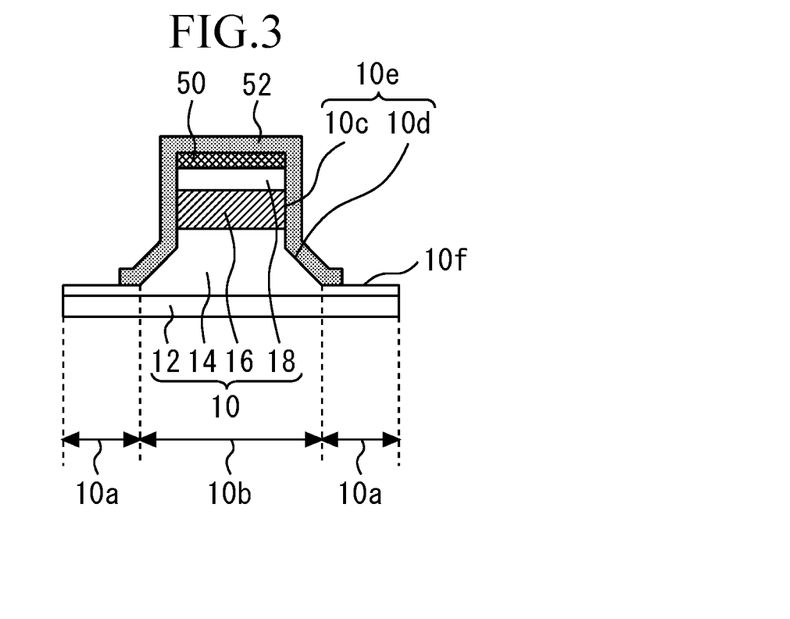
FIG. 3 is a diagram illustrating a state in which the mesa part is covered with the insulating film.

Next, the entire surface of the substrate is covered with an insulating film 52. The insulating film 52 is a SiN film, for example. The insulating film 52 is formed by the plasma CVD method, for example. Next, a portion covering the mesa part 10b in the insulating film 52 is selectively covered with a photoresist. Next, a portion covering the flat part 10a in the insulating film 52 is removed using the photoresist. The insulating film 52 is processed by the plasma dry etching using $SF_6$/He gas, for example. Next, the photoresist is removed. Thus, the mesa part 10b is covered with the insulating film 52. FIG. 3 is a diagram illustrating a state in which the mesa part 10b is covered with the insulating film 52.

Figure 4:
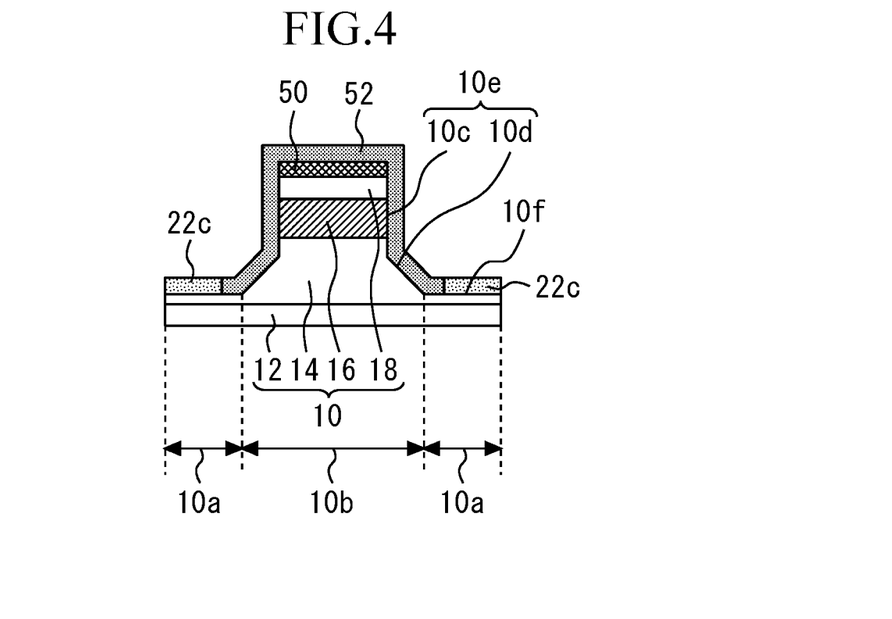
FIG. 4 is a diagram illustrating a state in which the first semiconductor layer has been grown.

Next, a first step of forming a first semiconductor layer 22c that becomes a base of the projecting part 23 will be described. First, the first semiconductor layer 22c is formed to cover the flat part 10a. The first semiconductor layer 22c is formed of p-InP, for example. The first semiconductor layer 22c is epitaxially grown by the MOCVD method using the insulating film 52 as a mask. FIG. 4 is a diagram illustrating a state in which the first semiconductor layer 22c has been grown.

Figure 5:
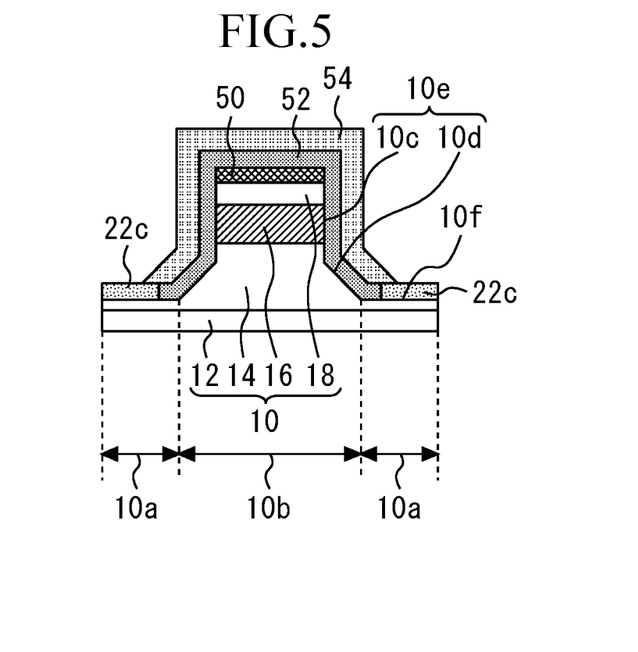
FIG. 5 is a diagram illustrating a state in which the mesa part is covered with the photoresist.

Next, the top surface and side surface 10e of the mesa part 10b are covered with a photoresist 54 from above the insulating film 52. At this time, the top surface of the first semiconductor layer 22c is covered with the photoresist 54 by a predetermined distance from the boundary between the flat part 10a and the mesa part 10b. FIG. 5 is a diagram illustrating a state in which the mesa part 10b is covered with the photoresist 54.

Figure 6:
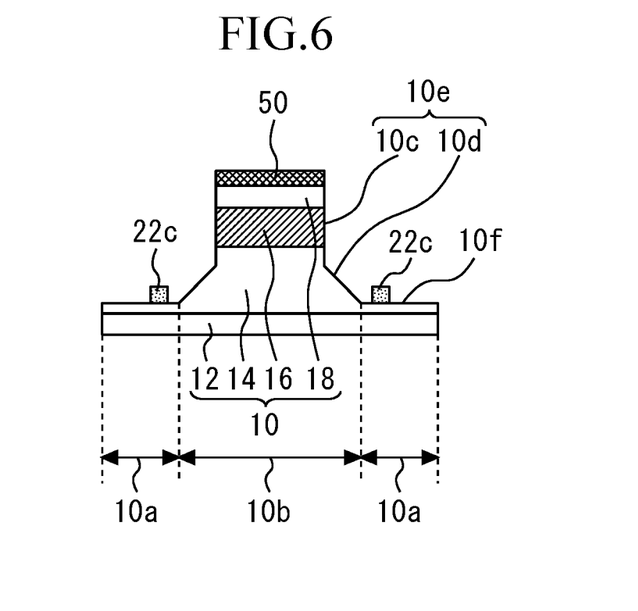
FIG. 6 is a diagram illustrating a state in which the first semiconductor layer has been etched.

Next, the first semiconductor layer 22c is etched using the photoresist 54 as a mask. FIG. 6 is a diagram illustrating a state in which the first semiconductor layer 22c has been etched. For the etching, plasma dry etching is used, for example. In this way, the first semiconductor layer 22c is formed into a lump shape. Thus, a portion covered with the photoresist 54 in the first semiconductor layer 22c serves as the first semiconductor layer 22c being of the p type and formed into a lump shape.

Note that in the state illustrated in FIG. 6, the photoresist 54 and the insulating film 52 have been removed. The insulating film 52 which is an SiN film is removed by the plasma dry etching using SFS/He gas with high selectivity to the insulating film 50 which is an SiO film, for example. Thus, the insulating film 50 is left on the mesa part 10b.

Figure 7:
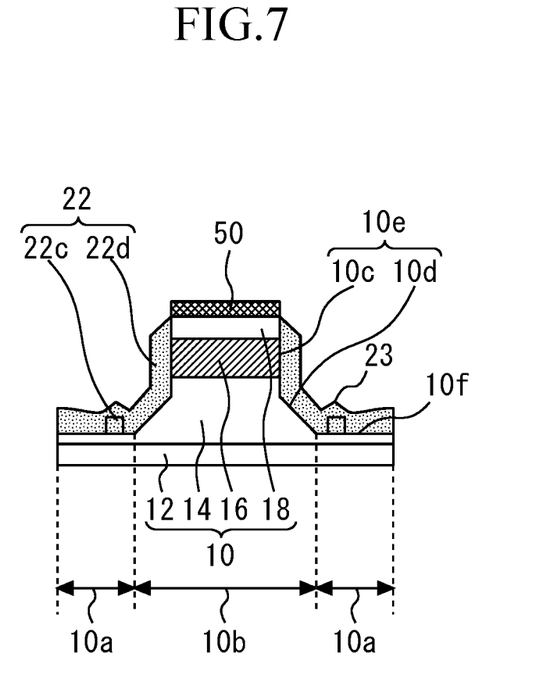
FIG. 7 is a diagram illustrating a state in which the second semiconductor layer is formed.

Next, a second step of forming the first embedded layer 22 is performed. First, a p type second semiconductor layer 22d covers the side surface 10e of the mesa part 10b, the top surface 10f of the flat part 10a, and the first semiconductor layer 22c. FIG. 7 is a diagram illustrating a state in which the second semiconductor layer 22d is formed. The second semiconductor layer 22d is epitaxially grown by the MOCVD method on both sides of the mesa part 10b using the insulating film 50 as a mask, for example. The second semiconductor layer 22d is formed of the same material as that of the first semiconductor layer 22c. In this way, the first embedded layer 22 having the first semiconductor layer 22c and the second semiconductor layer 22d is formed.

In the second step, the projecting part 23 is formed on the top surface of the portion covering the first semiconductor layer 22c in the second semiconductor layer 22d. That is, a portion corresponding to the projecting part 23 in the first embedded layer 22 is formed thicker than the other portions by an amount equal to the height of the first semiconductor layer 22c.

Next, the second embedded layer 24 is formed on the first embedded layer 22. Furthermore, the third embedded layer 26 is formed on the second embedded layer 24. The second embedded layer 24 and the third embedded layer 26 are epitaxially grown by the MOCVD method on both sides of the mesa part 10b, for example. As described above, the embedded layer 20 is formed on both sides of the mesa part 10b. The embedded layer 20 is also referred to as a block layer. The first embedded layer 22 has a function of controlling so that a narrow width of a reactive current path is achieved. Accordingly, the reactive current can be reduced by the first embedded layer 22.

Next, the contact layer 30 is formed on the main part 10 and the embedded layer 20. The contact layer 30 serves to cause the current to efficiently flow from the electrode to the laser. Next, the insulating film 32 is formed on the contact layer 30. Next, an opening is formed in the insulating film 32. The insulating film 32 serves to reduce parasitic capacitance and protect the semiconductor layer.

Next, the first electrode 34 is formed above the mesa part 10b to contact the contact layer 30 in the opening in the insulating film 32. The second electrode 40 is formed below the mesa part 10b. The first electrode 34 and the second electrode 40 are formed using a vapor deposition lift-off method, for example.

The semiconductor device 100 according to the present embodiment is a light source used for optical communication, for example. The semiconductor device 100 is an InP-based long-wavelength semiconductor laser having a wavelength of 1.3 to 1.55 µm, for example. According to such a semiconductor device 100, the loss in a quartz fiber can be reduced.

In recent years, the amount of data communication is increasing rapidly due to the widespread use of cellular phones such as smartphones and tablets and the cloudification of information. It may be required for the optical communication to achieve a stable operation under a high temperature environment in addition to a higher speed and a larger capacity. For a higher speed and a larger capacity, a distributed feedback (DFB) laser having a fine periodic structure that unifies the wavelengths may be sometimes used. In addition, a reduction in electrostatic capacitance of the device may be required.

The first cladding layer 14 and the embedded layer 20 of the present embodiment form a p-n-p-n structure. In such a structure, controlling dopant concentrations of the first portion 22a and second portion 22b of the first embedded layer 22 enables the reduction in the electrostatic capacitance and the suppression of the leak current.

A ratio of the leak current flowing especially in the portion covering the side surface of the active layer 16 in the first embedded layer 22 with respect to the injection current to the entire semiconductor device 100 is proportional to a cross-sectional area of the first embedded layer 22. Accordingly, the leak current can be reduced by reducing the thickness of the portion covering the side surface of the active layer 16 in the first embedded layer 22. However, if the first embedded layer 22 is excessively thinned, the leak current may be conversely increased. Accordingly, controlling the thickness of the portion covering the side surface of the active layer 16 in the first embedded layer 22 is especially important for high performance and stable operation of the semiconductor device 100.

The second embedded layer 24 has a high resistance, and is inserted to reduce the capacitance. When the portion covering the flat part 10a in the first embedded layer 22 is increased in thickness, this may make it to impossible to secure the thickness of the second embedded layer 24. This may prevent an increase in the speed of the semiconductor device 100. Accordingly, it is also important to control the thickness of the portion covering the flat part 10a in the first embedded layer 22.

Figure 8:
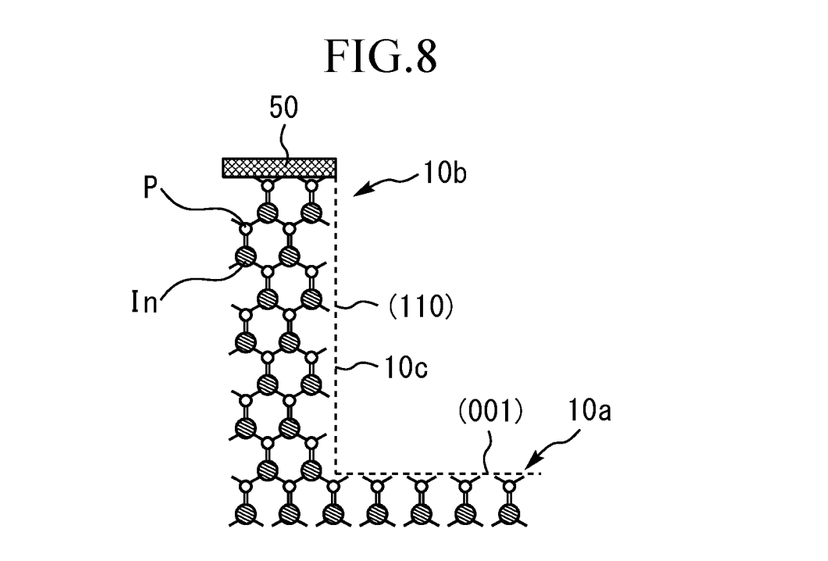
FIG. 8 is a diagram illustrating a state in which the flat part is formed by the plasma dry etching.

Next, as a comparative example of the present embodiment, a mechanism by which a transition surface is generated when the first embedded layer is formed will be described. FIG. 8 is a diagram illustrating a state in which the flat part 10a is formed by the plasma dry etching. The perpendicular surface 10c of the mesa part 10b has a (110) plane orientation. The top surface 10f of the flat part 10a has a (001) plane orientation.

Figure 9:
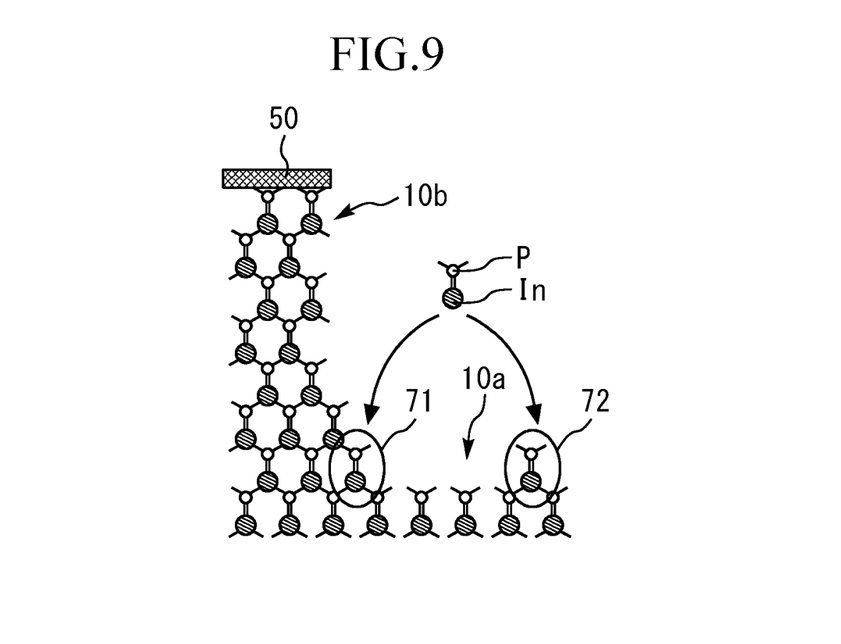
FIG. 9 is a diagram illustrating an initial state of a step of epitaxially growing a first embedded layer according to the comparative example.

FIG. 9 is a diagram illustrating an initial state of a step of epitaxially growing a first embedded layer according to the comparative example. FIG. 9 illustrates a state immediately after the growth of the first embedded layer is started. At this time, epitaxial growth components 72 of a (001) plane are generated. In addition, epitaxial growth components 71 of a (111)B plane are generated by migration. The (111)B plane corresponds to the inclined surface 10d of the present embodiment. Note that the inclined surface 10d may not always be a complete (111)B plane.

Figure 10:
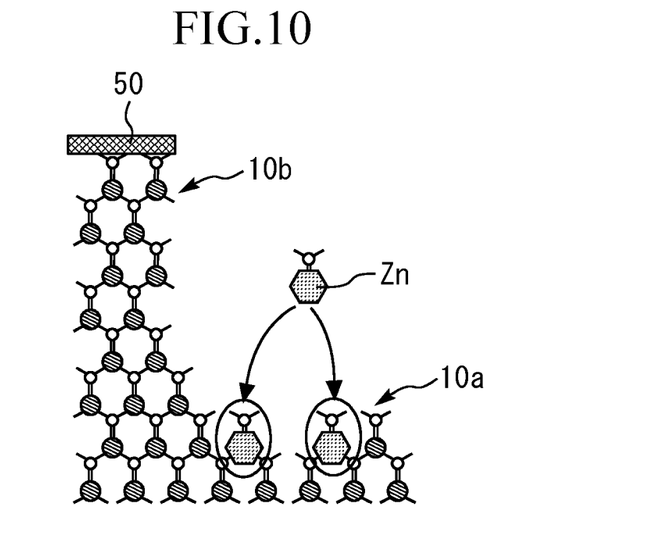
FIG. 10 is a diagram illustrating a state in which a dopant is introduced in the comparative example.
Figure 11:
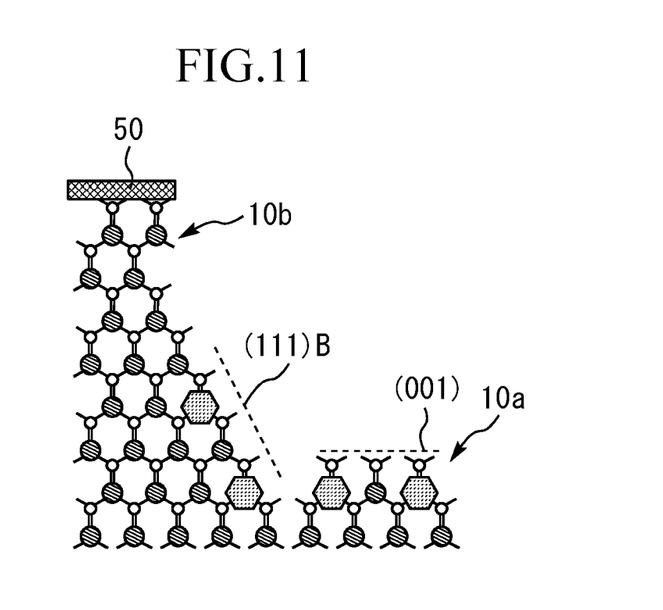
FIG. 11 is a diagram illustrating a state in which the (111)B plane and the (001) plane are formed in the comparative example.

FIG. 10 is a diagram illustrating a state in which a dopant is introduced in the comparative example. The dopant is Zn. The (111)B plane and the (001) plane appear by repeating the epitaxial growth and the dopant introduction which are illustrated in FIGS. 9 and 10. FIG. 11 is a diagram illustrating a state in which the (111)B plane and the (001) plane are formed in the comparative example.

Figure 12:
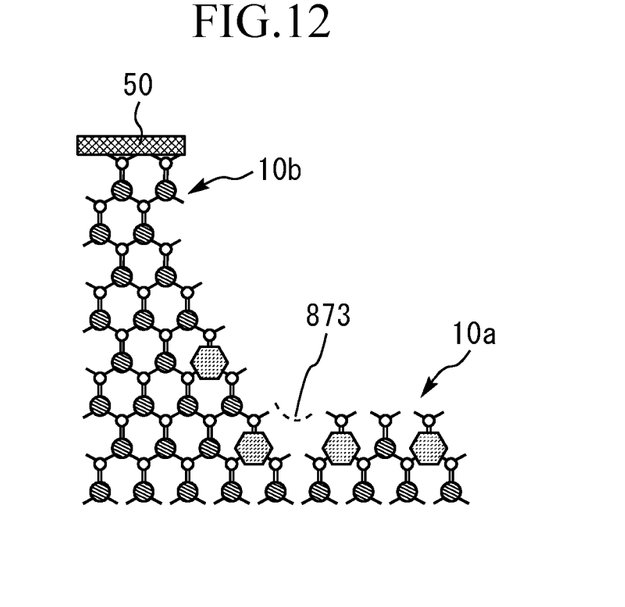
FIG. 12 is a diagram illustrating a state in which the transition surface is formed in the comparative example.

Each of the (111)B plane and the (001) plane is a plane on which the first embedded layer is easily grown. A portion at which these planes with a high growth rate intersect each other serves as a transition surface 873. FIG. 12 is a diagram illustrating a state in which the transition surface 873 is formed in the comparative example. Since the material is taken into the (111)B plane and the (001) plane, the first embedded layer is hardly grown in the transition surface 873.

Figure 13:
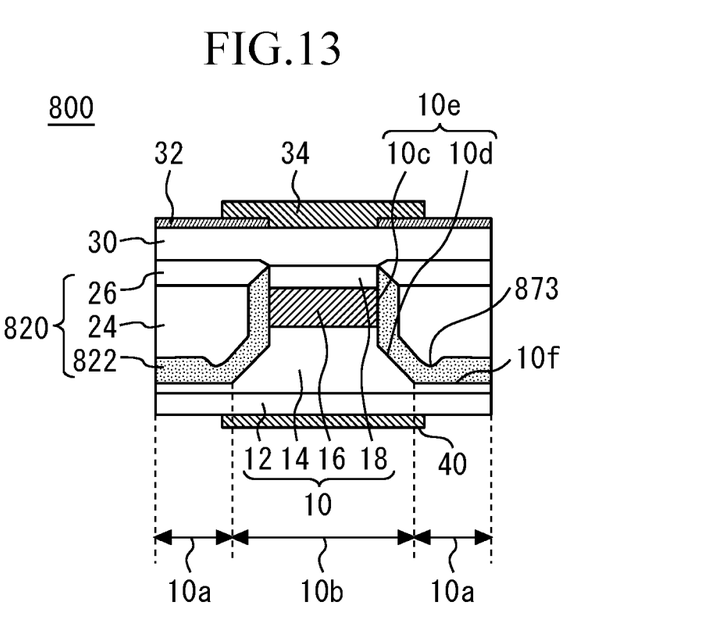
FIG. 13 is a cross-sectional view of a semiconductor device according to the comparative example.

FIG. 13 is a cross-sectional view of a semiconductor device 800 according to the comparative example. The semiconductor device 800 according to the comparative example is different from the semiconductor device 100 in a structure of an embedded layer 820. The embedded layer 820 has a first embedded layer 822. The transition surface 873 is formed in the first embedded layer 822. The thickness of a portion corresponding to the transition surface 873 of the first embedded layer 822 is thinner than that of the other portions of the first embedded layer 822.

In the semiconductor device 800, the first embedded layer 822 may be interrupted due to an influence of the transition surface 873. This may lead to connection between a first cladding layer 14 and a second embedded layer 24. In addition, this may lead to connection between a semiconductor substrate 12 and a second embedded layer 24. In this way, in the semiconductor device 800, the n-n connection may occur. Accordingly, the operation of the semiconductor device 800 may become unstable.

In order to suppress the n-n connection, it is proposed to increase the thickness of the first embedded layer 822. However, as described above, if the first embedded layer 822 is increased in thickness, the leak current may be increased. In addition, this may make it impossible to secure the thickness of the second embedded layer 24. In order to suppress the n-n connection, it is proposed to increase a p type dopant concentration. In this case, a high-concentration p type dopant exists in the side surface of an active layer 16. At this time, the p type dopant concentration of the active layer 16 is increased, which may prevent high performance and stable operation.

In contrast, in the present embodiment, the projecting part 23 is provided on the first embedded layer 22 to be adjacent to a boundary between the (111)B plane and the (001) plane. Forming the first embedded layer 22 so that the thickness of the portion corresponding to the transition surface is thicker than that of the other portions makes it possible to suppress the interruption of the first embedded layer 22. Accordingly, the p-n-p-n structure can be reliably formed, and the function of the first embedded layer 22 can be ensured.

A portion other than the projecting part 23 in the first embedded layer 22 can be reduced in thickness. In particular, in order that the thickness of the first embedded layer 22 in the transition surface 873 is secured, the second portion 22b covering the side surface 10e in the first embedded layer 22 can be prevented from being increased in thickness. Accordingly, the leak current can be suppressed.

The thickness of the second embedded layer 24 can be secured by reducing the thickness of the first portion 22a in the first embedded layer 22. Therefore, the capacitance of the semiconductor device 100 can be reduced. Accordingly, the high performance and stable operation of the semiconductor device 100 can be achieved at the same time.

Here, the finished thickness of the first embedded layer 22 in the present embodiment is thicker in the portion in which the projecting part 23 is provided than that of the other portion. However, without limited thereto, in the state in which the first embedded layer 22 is formed, it is only required that the first embedded layer 22 is not interrupted. That is, after the second semiconductor layer 22d is grown to cover the first semiconductor layer 22c, the projecting part 23 is not necessarily formed on the top surface of the portion covering the first semiconductor layer 22c in the second semiconductor layer 22d due to an influence of the transition surface.

That is, if the first embedded layer 22 is not interrupted, a recess may be formed in the top surface as illustrated in FIG. 13. Alternatively, the top surface of first embedded layer 22 may be flat.

In the state illustrated in FIG. 8, the side surface of the mesa part 10b is formed from the perpendicular surface 10c only. However, without limited thereto, the side surface of the mesa part 10b may have an inclined surface in a state immediately after the mesa part 10b is formed. In this case, the state immediately after the mesa part 10b is formed is equivalent to an intermediate state at the time of epitaxial growing as illustrated in FIGS. 9 and 10. Accordingly, also in this case, the transition surface 873 is generated.

The n-n connection may occur actually at a position apart from the mesa part 10b. Therefore, the projecting part 23 may be provided at a position apart from the boundary between the mesa part 10b and the flat part 10a. It is only required that the projecting part 23 is provided on the top surface of a portion in the first embedded layer 22, the portion being provided in a predetermined region of the flat part 10a. The predetermined region is a region within a height of the mesa part 10b from the boundary between the mesa part 10b and the flat part 10a in the top surface 10f of the flat part 10a, for example. Providing the projecting part 23 in this region can suppress the n-n connection effectively. Alternatively, the projecting part 23 may be provided at a position where the n-n connection readily occurs, in the top surface 10f of the flat part 10a. Note that the height of the mesa part 10b is a height from the top surface of the flat part 10a to the top surface of the mesa part 10b.

In the first step, it is only required that the lump-shaped first semiconductor layer 22c is formed in the region within the height of the mesa part 10b from the boundary between the mesa part 10b and the flat part 10a in the top surface 10f of the flat part 10a. In the step illustrated in FIG. 3, the distance of the projecting part 23 from the mesa part 10b can be changed by adjusting the portion covered with the insulating film 52 in the flat part 10a. That is, the lump-shaped first semiconductor layer 22c is formed at a position of the end of the insulating film 52. Therefore, the position of the end of the insulating film 52 is set as a reference position where the projecting part 23 is formed.

In the present embodiment, InP is used for the main part 10, the embedded layer 20, and the contact layer 30. The main part 10, the embedded layer 20, and the contact layer 30 may be formed of the material other than InP.

In the present embodiment, the example in which the semiconductor device 100 is a laser has been described. Examples of the laser include an electroabsorption modulator integrated laser diode (EML). The semiconductor device 100 can be also applied to an electroabsorption (EA) part of the EML. The semiconductor device 100 may be applied to all optical semiconductor devices.

Figure 14:
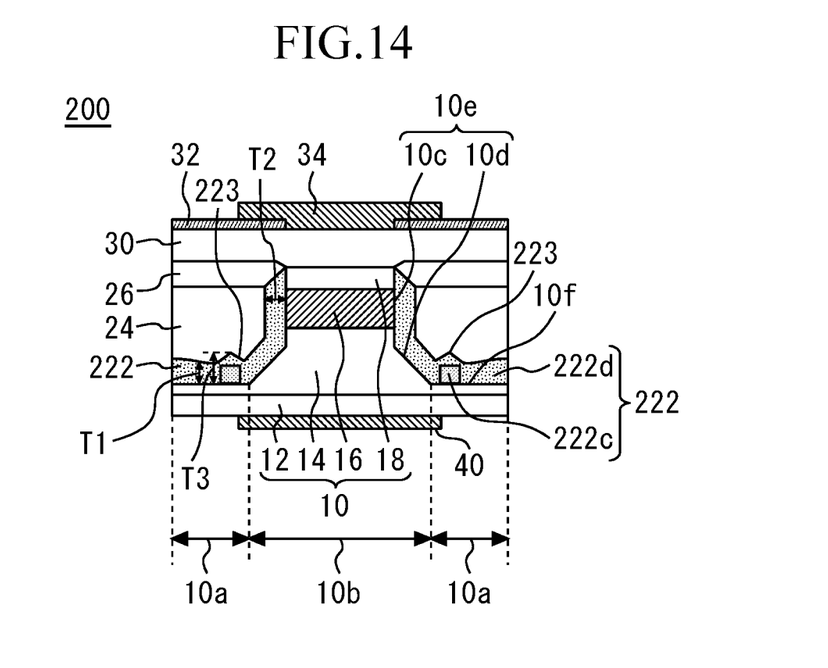
FIG. 14 is a cross-sectional view of a semiconductor device according to a first modification of the first embodiment.

FIG. 14 is a cross-sectional view of a semiconductor device 200 according to a first modification of the first embodiment. The semiconductor device 200 is different from the semiconductor device 100 in a configuration of a first embedded layer 222. A first embedded layer 222 has a lump-shaped first semiconductor layer 222c provided directly under the projecting part 223, and a second semiconductor layer 222d covering the first semiconductor layer 222c. The first semiconductor layer 222c and the second semiconductor layer 222d are formed of different materials.

The first semiconductor layer 222c may be, for example, a layer having a higher carrier concentration than that of the second semiconductor layer 222d. In this way, the first semiconductor layer 222c can be reduced in thickness. Accordingly, the first embedded layer 222 can be further reduced in thickness.

Figure 15:
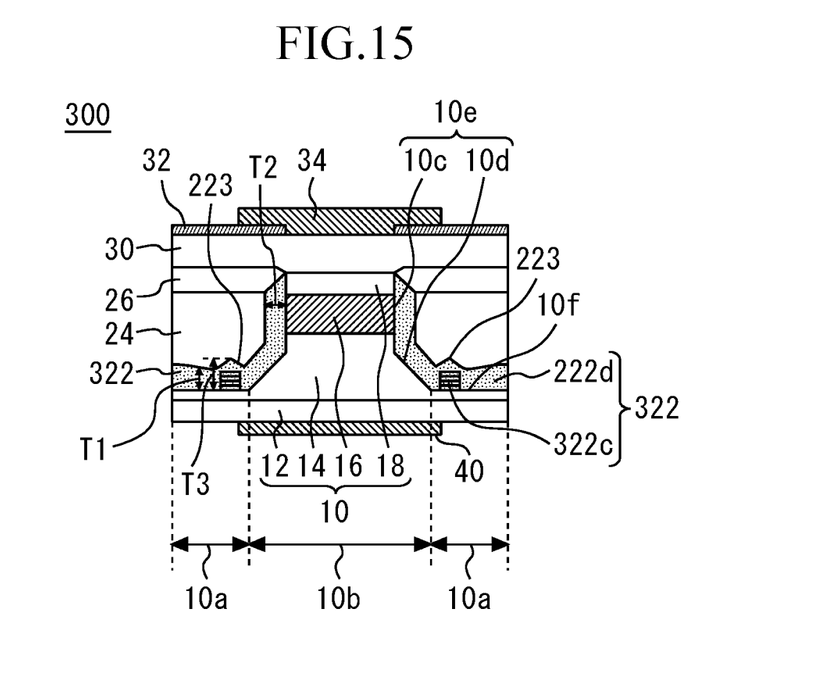
FIG. 15 is a cross-sectional view of a semiconductor device according to a second modification of the first embodiment.

FIG. 15 is a cross-sectional view of a semiconductor device 300 according to a second modification of the first embodiment. The semiconductor device 300 is different from the semiconductor device 100 in a configuration of a first embedded layer 322. In the first embedded layer 322, a first semiconductor layer 322c has a plurality of layers. That is, the first semiconductor layer 322c has a multilayer structure.

This can optimize the characteristics of the first semiconductor layer 322c, thereby further increasing the carrier concentration. In this way, the first semiconductor layer 322c can be further reduced in thickness. The first semiconductor layer 322c contains any one or a plurality of Al, In, As, Ga, P, and Sb, for example. The first semiconductor layer 322c further contains Zn, Fe, and Be as p type dopants, for example.

Figure 16:
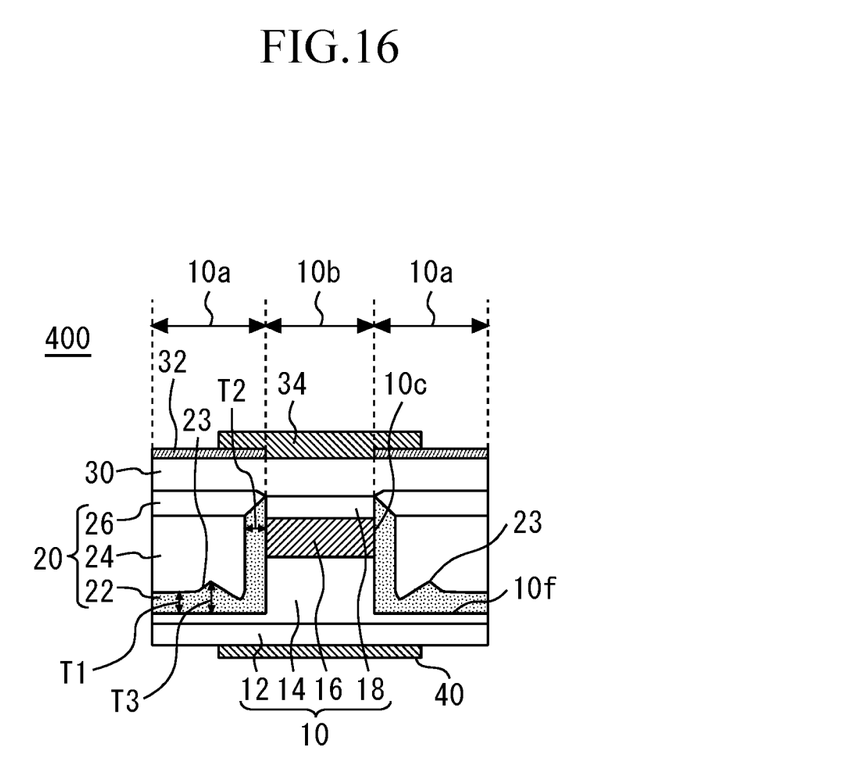
FIG. 16 is a cross-sectional view of a semiconductor device according to a third modification of the first embodiment.

FIG. 16 is a cross-sectional view of a semiconductor device 400 according to a third modification of the first embodiment. In the semiconductor device 400, aside surface 10e of a mesa part 10b may be formed of a perpendicular surface 10c only. In the case where a (111)B plane does not appear by migration or the like, a structure as illustrated in FIG. 16 is also assumed. In this case, a transition surface 873 appears more easily than the case where the (111)B plane appears. At this time, it is further important to suppress the interruption of the first embedded layer 22 by the projecting part 23.

The present disclosure is not limited to the above-described embodiment, and can be variously modified without departing from the scope of the present disclosure. The technical features described in the above-described embodiment may be combined as appropriate.

REFERENCE SIGNS LIST 10 main part, 10a flat part, 10b mesa part, 10c perpendicular surface, 10d inclined surface, 10e side surface, 10f top surface, 12 semiconductor substrate, 14 first cladding layer, 16 active layer, 18 second cladding layer, 20 embedded layer, 22 first embedded layer, 22a first portion, 22b second portion, 22c first semiconductor layer, 22d second semiconductor layer, 23 projecting part, 24 second embedded layer, 26 third embedded layer, 30 contact layer, 32 insulating film, 34 first electrode, 40 second electrode, 50 insulating film, 52 insulating film, 54 photoresist, 71, 72 epitaxial growth component, 100, 200 semiconductor device, 222 first embedded layer, 222c first semiconductor layer, 222d second semiconductor layer, 223 projecting part, 300 semiconductor device, 322 first embedded layer, 322c first semiconductor layer, 400, 800 semiconductor device, 820 embedded layer, 822 first embedded layer, 873 transition surface

The invention claimed is:

1. A semiconductor device, comprising:
a main part that includes a semiconductor substrate, a first cladding layer of a first type which is one of an n type and a p type, the first cladding layer being provided on the semiconductor substrate, an active layer provided on the first cladding layer, and a second cladding layer of a second type which is the other of the n type and the p type, the second cladding layer being provided on the active layer, and in which a flat part and a mesa part are formed, the mesa part being provided adjacent to the flat part, projecting upward with respect to the flat part and including the active layer;
a first embedded layer that is of the second type, and has a first portion configured to cover a top surface of the flat part and a second portion configured to cover a side surface of the mesa part;
a second embedded layer that is provided on the first embedded layer and is of the first type;
a first electrode provided above the mesa part; and
a second electrode provided below the mesa part,
wherein the first embedded layer has a projecting part on a top surface of a portion provided in a region within a height of the mesa part from a boundary between the mesa part and the flat part in the top surface of the flat part, and
the portion in which the projecting part is provided on the first embedded layer has a thickness thicker than the thickness of all other portions of the first portion.

2. The semiconductor device according to claim 1, wherein the projecting part is provided to be adjacent to the boundary between the mesa part and the flat part.

3. The semiconductor device according to claim 1, wherein the portion in which the projecting part is provided on the first embedded layer has a thickness thicker than the thickness of the second portion.

4. The semiconductor device according to claim 1, wherein the first embedded layer has a lump-shaped first semiconductor layer provided directly under the projecting part, and a second semiconductor layer covering the side surface of the mesa part, the top surface of the flat part, and the first semiconductor layer.

5. The semiconductor device according to claim 4, wherein the first semiconductor layer has a plurality of layers.

6. The semiconductor device according to claim 1, wherein
the side surface of the mesa part has an inclined surface connected to the top surface of the flat part, and
a portion in which the projecting part is provided on the first embedded layer has a thickness thicker than the thickness of a portion covering the inclined surface in the first embedded layer.

7. A method for manufacturing a semiconductor device, comprising:
forming, on a semiconductor substrate, a first cladding layer of a first type which is one of an n type and a p type, forming an active layer on the first cladding layer, forming, on the active layer, a second cladding layer of a second type which is the other of the n type and the p type to form a main part having the semiconductor substrate, the first cladding layer, the active layer, and the second cladding layer;
forming, in the main part, a flat part and a mesa part that is provided to be adjacent to the flat part, projects upward with respect to the flat part, and includes the active layer;
forming a first semiconductor layer being of the second type and formed into a lump shape in a region within a height of the mesa part from a boundary between the mesa part and the flat part in a top surface of the flat part;
covering a side surface of the mesa part, the top surface of the flat part, and the first semiconductor layer with a second semiconductor layer of the second type to form a first embedded layer having the first semiconductor layer and the second semiconductor layer, such that a portion of the first embedded layer at the lump shape extends further upward with respect to the flat part of the main part than all other portions of the first embedded layer;
forming a second embedded layer of the first type on the first embedded layer;
forming a first electrode above the mesa part; and
forming a second electrode below the mesa part.

8. The method for manufacturing a semiconductor device according to claim 7, wherein, in the step of forming the first embedded layer, a projecting part is formed on a top surface of a portion covering the first semiconductor layer in the second semiconductor layer at the portion of the first embedded layer at the lump shape.

9. The method for manufacturing a semiconductor device according to claim 7, comprising:
forming the first semiconductor layer to cover the flat part;
covering, with a photoresist, a top surface and the side surface of the mesa part, and a top surface of the first semiconductor layer by a predetermined distance from the boundary between the flat part and the mesa part; and
etching the first semiconductor layer using the photoresist as a mask to form the first semiconductor layer into a lump shape.

10. A semiconductor device, comprising:
a main part that includes a semiconductor substrate, a first cladding layer of a first type which is one of an n type and a p type, the first cladding layer being provided on the semiconductor substrate, an active layer provided on the first cladding layer, and a second cladding layer of a second type which is the other of the n type and the p type, the second cladding layer being provided on the active layer, and in which a flat part and a mesa part are formed, the mesa part being provided adjacent to the flat part, projecting upward with respect to the flat part and including the active layer;
a first embedded layer that is of the second type, and has a first portion configured to cover a top surface of the flat part and a second portion configured to cover a side surface of the mesa part;
a second embedded layer that is provided on the first embedded layer and is of the first type;
a first electrode provided above the mesa part; and
a second electrode provided below the mesa part,
wherein
the first embedded layer has a projecting part on a top surface of a portion provided in a region within a height of the mesa part from a boundary between the mesa part and the flat part in the top surface of the flat part,
the first embedded layer has a lump-shaped first semiconductor layer provided directly under the projecting part, and a second semiconductor layer covering the side surface of the mesa part, the top surface of the flat part, and the first semiconductor layer, and
the first semiconductor layer has a plurality of layers.

11. A semiconductor device, comprising:
- a main part that includes a semiconductor substrate, a first cladding layer of a first type which is one of an n type and a p type, the first cladding layer being provided on the semiconductor substrate, an active layer provided on the first cladding layer, and a second cladding layer of a second type which is the other of the n type and the p type, the second cladding layer being provided on the active layer, and in which a flat part and a mesa part are formed, the mesa part being provided adjacent to the flat part, projecting upward with respect to the flat part and including the active layer;
- a first embedded layer that is of the second type, and has a first portion configured to cover a top surface of the flat part and a second portion configured to cover a side surface of the mesa part;
- a second embedded layer that is provided on the first embedded layer and is of the first type;
- a first electrode provided above the mesa part; and
- a second electrode provided below the mesa part, wherein
- the first embedded layer has a projecting part on a top surface of a portion provided in a region within a height of the mesa part from a boundary between the mesa part and the flat part in the top surface of the flat part,
- the side surface of the mesa part has an inclined surface connected to the top surface of the flat part, and
- a portion in which the projecting part is provided on the first embedded layer has a thickness thicker than the thickness of a portion covering the inclined surface in the first embedded layer.

* * * * *